(12) United States Patent
Maita et al.

(10) Patent No.: US 10,970,478 B2
(45) Date of Patent: Apr. 6, 2021

(54) TABULAR DATA ANALYSIS METHOD, RECORDING MEDIUM STORING TABULAR DATA ANALYSIS PROGRAM, AND INFORMATION PROCESSING APPARATUS

(71) Applicant: FUJITSU LIMITED, Kawasaki (JP)

(72) Inventors: Tsuyoshi Maita, Aomori (JP); Nobumi Noro, Aomori (JP); Tetsu Tanaka, Hirosaki (JP)

(73) Assignee: FUJITSU LIMITED, Kawasaki (JP)

( * ) Notice: Subject to any disclaimer, the term of this patent is extended or adjusted under 35 U.S.C. 154(b) by 109 days.

(21) Appl. No.: 16/048,518

(22) Filed: Jul. 30, 2018

(65) Prior Publication Data

US 2018/0365205 A1 Dec. 20, 2018

Related U.S. Application Data

(63) Continuation of application No. PCT/JP2016/053388, filed on Feb. 4, 2016.

(51) Int. Cl.
| | |
|---|---|
| *G06F 3/00* | (2006.01) |
| *G06F 40/177* | (2020.01) |
| *G06Q 10/10* | (2012.01) |
| *G06F 40/20* | (2020.01) |
| *G06F 40/166* | (2020.01) |

(52) U.S. Cl.
CPC .......... *G06F 40/177* (2020.01); *G06F 40/166* (2020.01); *G06F 40/20* (2020.01); *G06Q 10/10* (2013.01)

(58) Field of Classification Search
CPC ........ G06F 40/166; G06F 40/20; G06Q 10/10
See application file for complete search history.

(56) References Cited

U.S. PATENT DOCUMENTS

| | | | | |
|---|---|---|---|---|
| 6,046,740 | A * | 4/2000 | LaRoche | G06K 9/00476 |
| | | | | 715/764 |
| 2004/0193520 | A1* | 9/2004 | LaComb | G06Q 10/10 |
| | | | | 705/35 |
| 2010/0057704 | A1* | 3/2010 | Duffle | G06F 11/2268 |
| | | | | 707/E17.062 |

(Continued)

FOREIGN PATENT DOCUMENTS

| | | |
|---|---|---|
| JP | 11-328282 A | 11/1999 |
| JP | 2005-242587 A | 9/2005 |
| JP | 2006-139512 A | 6/2006 |

(Continued)

OTHER PUBLICATIONS

International Search Report dated Mar. 8, 2016, issued in Counterpart of International Application No. PCT/JP2016/053388 (2 pages).

(Continued)

*Primary Examiner* — Kyle R Stork
(74) *Attorney, Agent, or Firm* — Westerman, Hattori, Daniels & Adrian, LLP

(57) ABSTRACT

A tabular data analysis method includes determining, by a computer, whether a cell having data is present for each row or each column of input tabular data, and extracting, in a case where there is one or more cells having data, a block of rows or columns in which the one or more cells are consecutively included, as a part related to one piece of table data.

16 Claims, 22 Drawing Sheets

(56) References Cited

U.S. PATENT DOCUMENTS

2016/0117412 A1* 4/2016 Mungi ............... G06F 16/2471
                   707/774

FOREIGN PATENT DOCUMENTS

| JP | 2007-122638 A | 5/2007 |
|---|---|---|
| JP | 2013-15909 A | 1/2013 |
| JP | 2014-74947 A | 4/2014 |

OTHER PUBLICATIONS

Written Opinion dated Mar. 8, 2016, issued in counterpart International Application No. PCT/JP2016/053388, with partial English translation. (13 pages).

Office action dated Aug. 20, 2019, issued in counterpart JP application No. 2017-565353, with English translation. (12 pages).

* cited by examiner

FIG. 2

| | A | B | C | D | E | F | G | H | I |
|---|---|---|---|---|---|---|---|---|---|
| 1 | TITLE | | | | | | | 2015/4/6 | |
| 2 | | | | | | | | | |
| 3 | SIMPLE TABLE | | | | | | | | |
| 4 | | ITEM 1 | ITEM 2 | ITEM 3 | ITEM 4 | | | | |
| 5 | | a | | | | | | | |
| 6 | | b | | | | | | | |
| 7 | | c | | | | | | | |
| 8 | | d | | | | | | | |
| 9 | | e | | | | | | | |
| 10 | | f | | | | | | | |
| 11 | | g | | | | | | | |
| 12 | | | | | | | | | |
| 13 | | | | | | | | | |
| 14 | TABLE WITH INTERCONNECTED CELLS | | | | | | | | |
| 15 | | ITEM 1 | | ITEM 3 | ITEM 4 | | | | |
| 16 | | 1b | 1b | | | | | | |
| 17 | * | a | | 1 | 2 | 3 | | | |
| 18 | * | b | | 1 | 2 | 3 | | | |
| 19 | | c | | 1 | 2 | 3 | | | |
| 20 | | d | | 1 | 2 | 3 | | | |
| 21 | | | | 1 | 2 | 3 | | | |
| 22 | | e | | 1 | 2 | 3 | | | |
| 23 | | | | 1 | 2 | 3 | | | |
| 24 | ※SUPPLEMENTARY MATTER | | | | | | | | |
| 25 | | | | | | | | | |
| 26 | | | | | | | | | |
| 27 | | | | | | | | | |

| ROW | ITEM | VALUE |
|---|---|---|
| 1 | x1 | y1 |
| 1 | x2 | 11 |
| 1 | x3 | 12 |
| 1 | x4 | 13 |
| 1 | x5 | 14 |
| 2 | x1 | y2 |
| 2 | x2 | 21 |
| 2 | x3 | 22 |
| 2 | x4 | 23 |
| 2 | x5 | 24 |
| 3 | x1 | y3 |
| 3 | x2 | 25 |
| 3 | x3 | 26 |
| 3 | x4 | 27 |
| 3 | x5 | 28 |

FIG. 6

| a | | b | | | c |
|---|---|---|---|---|---|
| d | e | f | g | h | i |
| 1 | 2 | 3 | 4 | 5 | 6 |
| 1 | 2 | 3 | 4 | | |
| 1 | 2 | | | 5 | |

22

⇨

| a | a | b | b | b | c |
|---|---|---|---|---|---|
| d | e | f | g | h | i |
| 1 | 2 | 3 | 4 | 5 | 6 |
| 1 | 2 | 3 | 4 | | |
| 1 | 2 | | | 5 | |

| a | b | e | f |
|---|---|---|---|
| g | h | i | j | k | l |
| 1 | 2 | 3 | 4 | 5 | |
| 1 | 2 | 3 | | | |

24

⇒

| a | a | b | b | e | f |
|---|---|---|---|---|---|
| g | h | i | j | k | l |
| 1 | 2 | 3 | 4 | 5 | |
| 1 | 2 | 3 | | | |

| a | b | c | d | e | f |
|---|---|---|---|---|---|
| g | 1 | 2 | 3 |   | 5 |
| g | 1 | 2 | 3 | 4 |   |
| g | 1 | 1 | 1 |   |   |
| g | 2 | 2 | 2 |   |   |
| h | 3 | 3 | 3 |   |   |
| h | 4 | 4 | 4 |   |   |
| h | 5 | 5 | 5 | 5 |   |

26

⇒

| a | b | c | d | e | f |
|---|---|---|---|---|---|
| g | 1 | 2 | 3 |   | 5 |
| g | 1 | 2 | 3 | 4 |   |
| g | 1 | 1 | 1 |   |   |
| g | 2 | 2 | 2 |   |   |
| h | 3 | 3 | 3 |   |   |
| h | 4 | 4 | 4 |   |   |
| h | 5 | 5 | 5 | 5 |   |

| a | | b | | e | f |
|---|---|---|---|---|---|
| g | h | i | j | k | 50 |
| 1 | 2 | 3 | 4 | 5 | 50 |
| TOTAL | | | | | 100 |

⟹

| a | a | b | b | e | f |
|---|---|---|---|---|---|
| g | h | i | j | k | 50 |
| 1 | 2 | 3 | 4 | 5 | 50 |
| TOTAL | 100 | | | | |

FIG. 10

| a | | b | c | d | e |
|---|---|---|---|---|---|
| | | f | g | h | i |
| j | m | 2 | 3 | 4 | 5 |
| k | n | 2 | 3 | | |
| l | o | 2 | | | |

30

| a | b/f | c/g | d/h | e/i |
|---|---|---|---|---|
| j/m | 2 | 3 | 4 | 5 |
| k/n | 2 | 3 | | |
| l/o | 2 | | | |

| a | | b | | | c |
|---|---|---|---|---|---|
| d | e | f | g | h | i |
| 1 | 2 | 3 | 4 | 5 | 6 |
| 1 | 2 | 3 | 4 | | |
| 1 | 2 | | | 5 | |

⇒

| a/d | a/e | b/f | b/g | b/h | c/i |
|-----|-----|-----|-----|-----|-----|
| 1 | 2 | 3 | 4 | 5 | 6 |
| 1 | 2 | 3 | 4 | | |
| 1 | 2 | | | 5 | |

FIG. 12

| title | | | | | 1 |
|---|---|---|---|---|---|
| a | b | c | d | e | 5 |
| 1 | 2 | 3 | 4 | | 4 |
| 1 | 2 | 3 | | | 3 |
| 1 | 2 | | | | 2 |
| 1 | | | | | 1 |

| title | | | | 37 | 38 |
|---|---|---|---|---|---|
| | | | | | 1 |
| a | b | c | d | e | 5 |
| 1 | 2 | 3 | 4 | | 4 |
| 1 | 2 | 3 | | | 3 |
| f | g | h | i | j | 5 |
| 1 | 2 | | | | 2 |

FIG. 14

| title | | | | 41 |
|---|---|---|---|---|
| a | b | c | d | e |
| f | g | 1 | 2 | 3 |
| 1 | 2 | 3 | | |
| f | g | h | i | j |
| 1 | 2 | | | |

42 43

| 5 | 100% |
|---|---|
| 5 | 40% |

FIG. 15

| title | | | | |
|---|---|---|---|---|
| a | b | c | d | e |
| d | e | 1 | g | 2 |
| 1 | 2 | 3 | | |
| f | g | h | i | j |
| 1 | 2 | | | |

| 5 | 100% |
|---|---|
| 5 | 60% |

FIG. 16

| a | b | c | d | e |
|---|---|---|---|---|
| 1 | 2 | 3 | 4 |   |
| 1 | 2 | 3 |   |   |
| f | g | h | i | j |
| 1 | 2 |   |   |   |

|   | a | c | d | e |
|---|---|---|---|---|
| 1 | 2 | 3 | 4 |   |
| 1 | 2 | 3 |   |   |
| f | g | h | i | j |
| 1 | 2 |   |   |   |

|   |   |   |   |   | 56 |
|---|---|---|---|---|---|
| a | a | b | c | d |   |
| y1 | 11 | 12 | 13 | 14 |   |
| y2 | 21 | 22 | 23 | 24 |   |
| y3 | 31 | 32 | 33 | 34 |   |

⇩

|   |   |   |   |   | 58 |
|---|---|---|---|---|---|
| x1 | x2 | x3 | x4 | x5 | 59 |
| a | a | b | c | d |   |
| y1 | 11 | 12 | 13 | 14 |   |
| y2 | 21 | 22 | 23 | 24 |   |
| y3 | 31 | 32 | 33 | 34 |   |

US 10,970,478 B2

TABULAR DATA ANALYSIS METHOD, RECORDING MEDIUM STORING TABULAR DATA ANALYSIS PROGRAM, AND INFORMATION PROCESSING APPARATUS

CROSS-REFERENCE TO RELATED APPLICATION

This application is a continuation application of International Application PCT/JP2016/053388 filed on Feb. 4, 2016 and designated the U.S., the entire contents of which are incorporated herein by reference.

FIELD

The embodiments discussed herein are related to a tabular data analysis method, a recording medium storing a tabular data analysis program, and an information processing apparatus.

BACKGROUND

In recent years, for example, a local government collects various types of information on tourist spots within an area of the local government and makes the information public on a website on the Internet. The local government receives information from facilities and the like located in the tourist spots to collect information on the tourist spots. In addition, a company entrusted by the local government may receive information on tourist spots as open data from the local government and input the information. In this case, the information to be provided is, for example, information based on various formats including a file format of various spreadsheet software which is tabular data, a comma-separated values (CSV) format, a tab-separated values (TSV) format, or the like.

Japanese Laid-open Patent Publication No. 2013-015909 is an example of the related art.

SUMMARY

According to an aspect of the embodiments, a tabular data analysis method includes determining, by a computer, whether a cell having data is present for each row or each column of input tabular data, and extracting, in a case where there is one or more cells having data, a block of rows or columns in which the one or more cells are consecutively included, as a part related to one piece of table data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating exemplary tabular data and table data;

FIG. 3 is a diagram illustrating an exemplary information DB;

FIG. 6 is a diagram illustrating an exemplary editing process;

FIG. 7 is a diagram illustrating another exemplary editing process;

FIG. 8 is a diagram illustrating another exemplary editing process;

FIG. 9 is a diagram illustrating an exemplary cancellation of interconnection of cells in a row which is not an item row;

FIG. 10 is a diagram illustrating an exemplary generation of an item name;

FIG. 11 is a diagram illustrating another exemplary generation of an item name;

FIG. 12 is a diagram illustrating an exemplary item row specification;

FIG. 13 is a diagram illustrating another exemplary item row specification;

FIG. 14 is a diagram illustrating another exemplary item row specification;

FIG. 15 is a diagram illustrating another exemplary item row specification;

FIG. 16 is a diagram illustrating an exemplary item column specification;

FIG. 17 is a diagram illustrating another exemplary item column specification;

FIG. 18 is a diagram illustrating an exemplary item row addition;

DESCRIPTION OF EMBODIMENTS

For example, since tabular data formats of information are not unified, when, for example, tabular data is registered in a database (hereinafter also referred to as DB), association between items and values of the tabular data is not maintained in some cases. Therefore, it may be troublesome for an administrator who registers the tabular data in the DB to correct the association between the items and the values, and check whether the tabular data is registered normally.

For example, a tabular data analysis method or the like may be provided with which tabular data of various formats are easily registered.

Hereinafter, embodiments of a tabular data analysis method, a tabular data analysis program, and an information processing apparatus disclosed in the present application are described in detail with reference to the drawings. Note that the disclosed technique is not limited to the embodiments. Further, the following embodiments may be appropriately combined within a scope consistent with each other.

Figure 1:
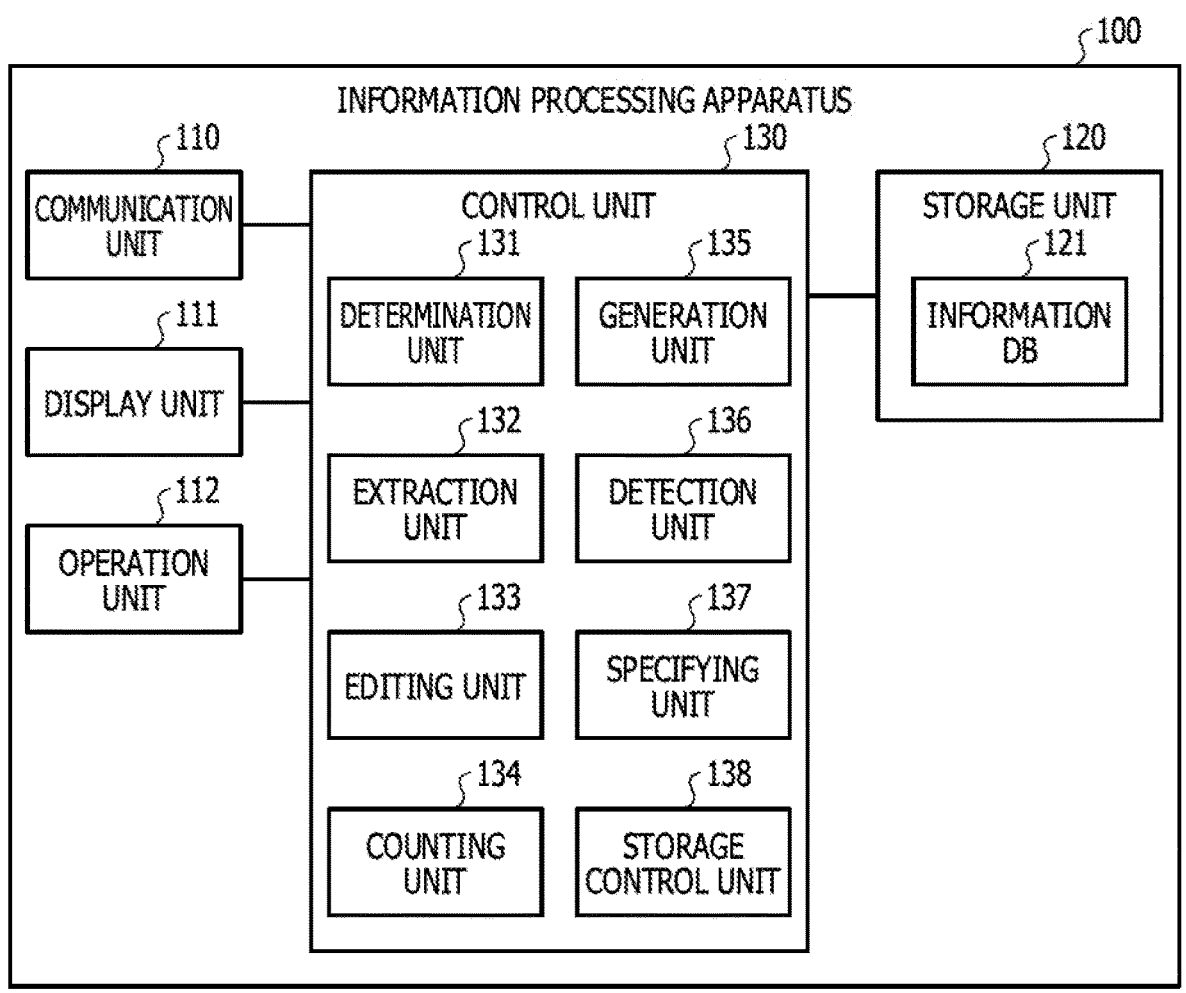
FIG. 1 is a block diagram illustrating an exemplary configuration of an information processing apparatus of an embodiment.

FIG. 1 is a block diagram illustrating an exemplary configuration of an information processing apparatus of an embodiment. The information processing apparatus 100 illustrated in FIG. 1 determines whether a cell to which data has been input is present for each row or each column of input tabular data. Further, the information processing apparatus 100 extracts a block including a plurality of consecutive rows or columns having cells to which data is input, as a part related to one piece of table data. Thus, the information processing apparatus 100 easily registers tabular data of various formats. The following description mainly focuses on a row direction, but the description is also applicable to a column direction as well.

The information processing apparatus 100 illustrated in FIG. 1 includes a communication unit 110, a display unit 111, an operation unit 112, a storage unit 120, and a control unit 130. In addition to the functional units illustrated in FIG. 1, the information processing apparatus 100 may have various functional units of a known computer, for example, functional units of various communication devices, input devices, audio output devices and the like. As an example of the information processing apparatus 100, a stationary computer of a server or the like may be adopted. As the information processing apparatus 100, not only the stationary computer of the server or the like, but also a portable or stationary personal computer may be adopted as the information processing apparatus 100.

The communication unit 110 is realized by, for example, a network interface card (NIC) or the like. The communication unit 110 is a communication interface that is wired or wirelessly coupled to a terminal device of a user (not illustrated) through a network (not illustrated), and is responsible for communication of information with the terminal device. The communication unit 110 receives tabular data from terminal devices. The communication unit 110 outputs the received tabular data to the control unit 130.

Here, tabular data is described with reference to FIG. 2. FIG. 2 is a diagram illustrating exemplary tabular data and table data. The tabular data 11 illustrated in FIG. 2 is, for example, data including plural table data 12a and 12b, a title of the tabular data 11 and the like. Note that, in the following description, for example, data of one entire file is expressed as tabular data, and individual tables in tabular data are expressed as table data. The tabular data 11 includes, for example, table data having an item (header) in the uppermost row, table data having an item in the uppermost row and leftmost column, table data in which cells are interconnected to represent sub-items and therefore item rows extend over two rows, and the like. Note that, the table data is not limited to these, and any data may be used as long as it may be expressed in the form of a matrix. In addition, for the tabular data, for example, open data provided by government and public offices or local governments may be used.

Returning to the description of FIG. 1, the display unit 111 is a display device that displays various types of information. The display unit 111 is realized by, for example, a liquid crystal display or the like as a display device. The display unit 111 displays various screens of a display screen or the like input from the control unit 130.

The operation unit 112 is an input device that receives various operations from an administrator of the information processing apparatus 100. The operation unit 112 is realized by, for example, a keyboard, a mouse, or the like as an input device. The operation unit 112 outputs, to the control unit 130, the operation input by the administrator as operation information. Note that, the operation unit 112 may be realized by a touch panel or the like as an input device, and the display device of the display unit 111 and the input device of the operation unit 112 may be integrated.

The storage unit 120 is realized by, for example, a semiconductor memory device of a random access memory (RAM), a flash memory, or the like, or a storage device of a hard disk, an optical disk, or the like. The storage unit 120 has an information database 121. Note that, in the following description, the information database 121 is abbreviated and expressed as an information DB 121. Further, the storage unit 120 stores information used for processing in the control unit 130.

The information DB 121 stores items and values in association with each other, for table data. FIG. 3 is a diagram illustrating an exemplary information DB. As illustrated in FIG. 3, the information DB 121 has items of "row", "item", and "value". The information DB 121 stores, for example, each cell constituting the table data as one record.

"Row" is information indicating a row including a cell to which data is input. "Item" is information indicating an item corresponding to a cell. "Value" is information indicating data stored in a cell. In the example of the first row in FIG. 3, the value of the item "x1" in the row "1" of the table data is "y1".

Returning to the explanation of FIG. 1, the control unit 130 is realized by a central processing unit (CPU), a micro processing unit (MPU), or the like executing a program stored in an internal storage device, with a RAM as a work area, for example. Further, the control unit 130 may be realized by, for example, an integrated circuit of an application specific integrated circuit (ASIC), a field programmable gate array (FPGA), or the like. The control unit 130 includes a determination unit 131, an extraction unit 132, an editing unit 133, a counting unit 134, a generation unit 135, a detection unit 136, a specifying unit 137, and a storage control unit 138 to realize or execute information processing functions and operations to be described below. Note that the internal configuration of the control unit 130 is not limited to the configuration illustrated in FIG. 1, and other configurations may be adopted as long as information processing is performed as described later.

When tabular data is input from the communication unit 110, the determination unit 131 determines whether there is a cell to which data is input, for each row or each column of the input tabular data. For example, the determination unit 131 determines whether a cell to which data is input is present in the tabular data. The determination unit 131 outputs the tabular data and the determination result to the extraction unit 132.

When the tabular data and the determination result are input from the determination unit 131, the extraction unit 132 extracts, from the tabular data, blocks of a plurality of consecutive rows or columns having cells in which the data is input, as a part related to one piece of table data, based on the determination result. For example, when two blocks each including one or a plurality of consecutive rows or columns where a cell to which data is input is present are detected with one or a plurality of consecutive rows or columns where there is no cell to which data is input interposed between the two blocks, the extraction unit 132 extracts the two blocks as different table data, respectively. Upon extracting the table data, the extraction unit 132 outputs the extracted table data as first table data to the editing unit 133 and the generation unit 135. In addition, the extraction unit 132 stores the first table data in the storage unit 120.

Figure 4:
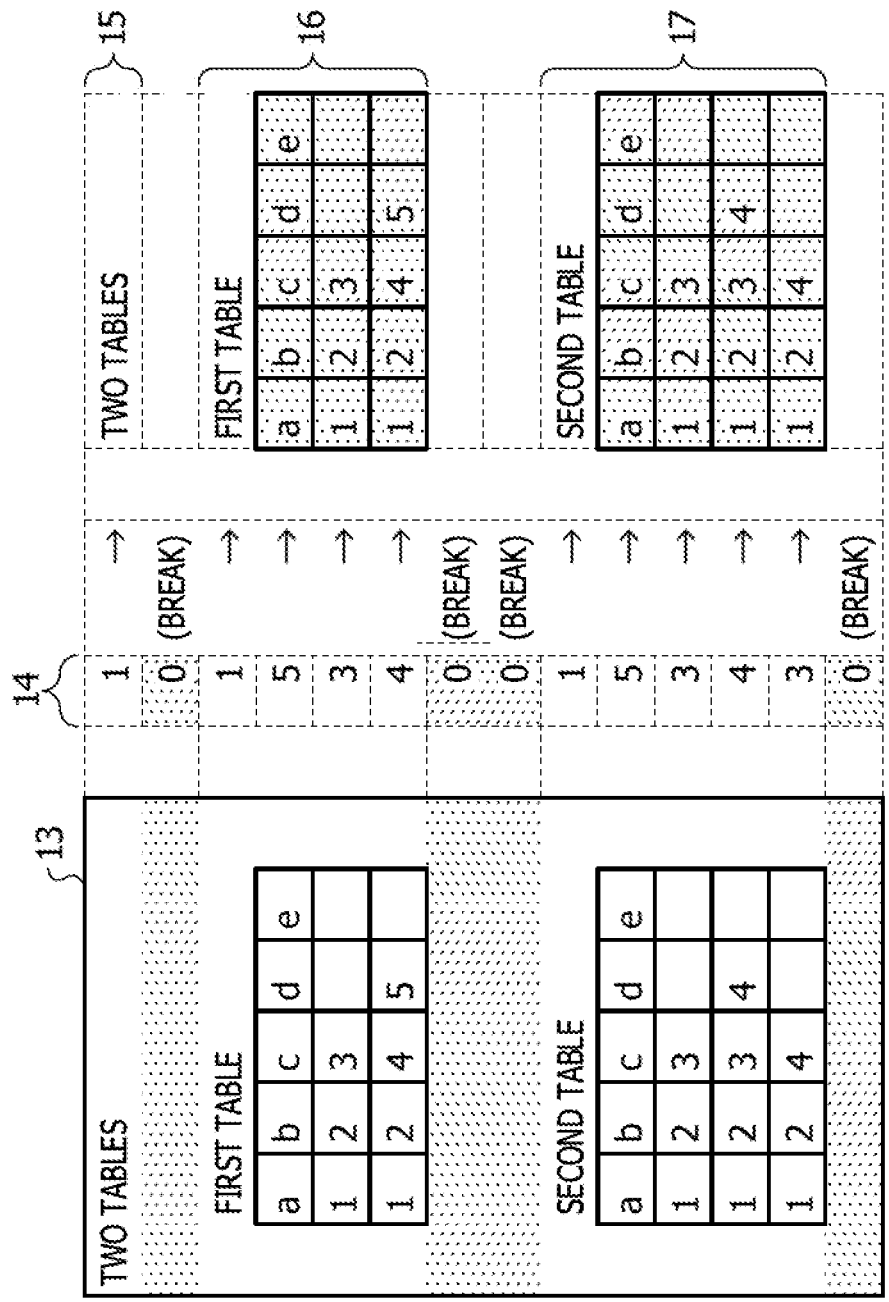
FIG. 4 is a diagram illustrating an exemplary extraction of table data.

Here, extraction of table data is described with reference to FIGS. 4 and 5. FIG. 4 is a diagram illustrating an exemplary extraction of table data. FIG. 4 illustrates an exemplary case where there is a plurality of table data in the vertical direction. In the example of FIG. 4, a data input number 14 of each row is detected for the tabular data 13. For example, in the tabular data 13, since the title of the tabular data 13 is input to one cell in the first row, the data input number 14 is "1". In addition, in the second row, since there is no cell to which data is input, the data input number 14 is "0". Similarly, the data input number 14 of each row is detected.

The extraction unit 132 determines the row having the data input number 14 of "0" as the break of the table data and divides the tabular data 13 at the break. Note that, in the following description, a block which is a part related to divided table data is also referred to as a cluster. The tabular data 13 is divided into a cluster 15, a cluster 16, and a cluster 17. The cluster 15 is a title of the tabular data 13. The cluster 16 is a first piece of table data. The cluster 17 is a second piece of table data. The extraction unit 132 extracts the cluster 16 and the cluster 17 as first table data. Note that, the extracted first table data is rendered to a tabular form using, for example, a two-dimensional array on a memory. Further, in the following description, the same applies to each table data based on the first table data.

Figure 5:
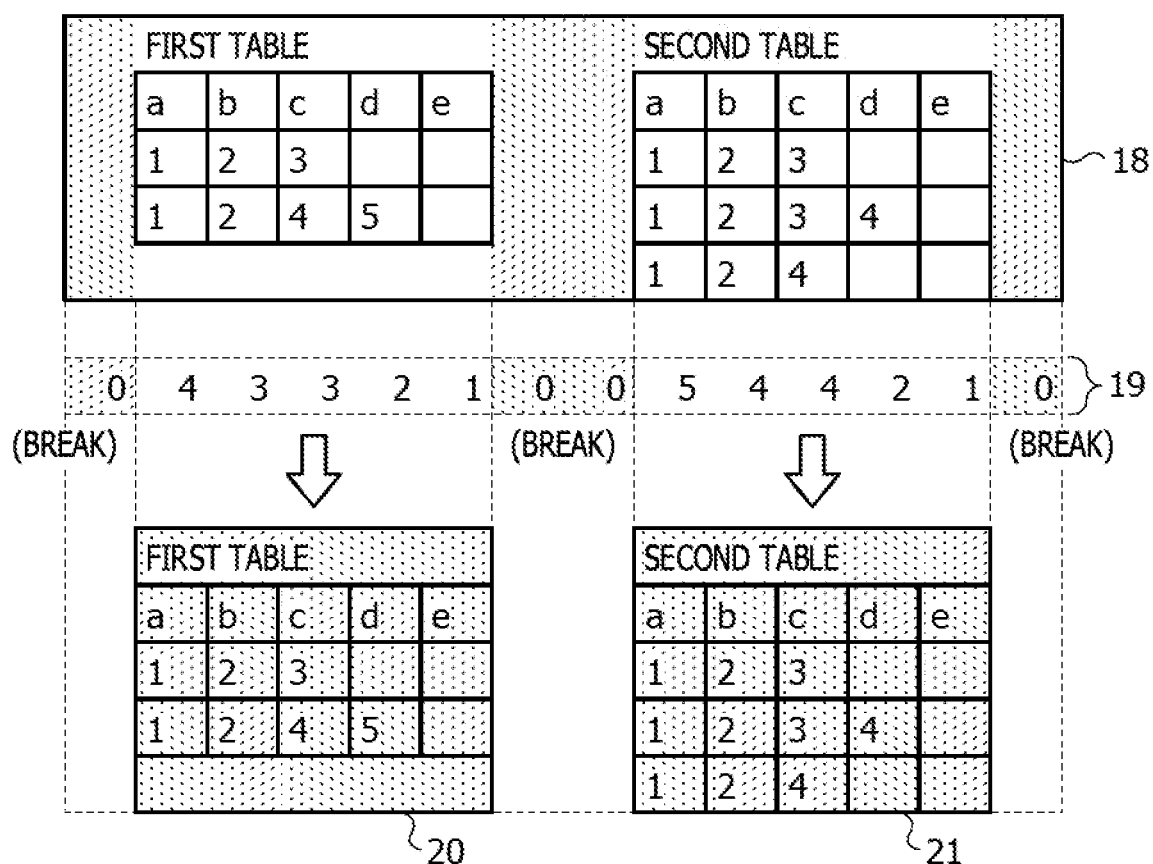
FIG. 5 is a diagram illustrating another exemplary extraction of table data.

FIG. 5 is a diagram illustrating another exemplary extraction of table data. FIG. 5 illustrates an exemplary case where there is a plurality of table data in the horizontal direction. In the example of FIG. 5, a data input number 19 of each column is detected for the tabular data 18. For example, in the tabular data 18, in the first column, since there is no cell to which data is input, the data input number 19 is "0". Further, in the second column, since the title of the tabular data 18 is input in the first row, "a" is input in the second row, "1" is input in the third row, and "1" is input in the fourth row, the data input number 19 is "4". Similarly, the data input number 19 of each column is detected.

The extraction unit 132 determines the column having the data input number 19 of "0" as the break of the table data and divides the tabular data 18 at the break. The tabular data 18 is divided into a cluster 20 and a cluster 21. The cluster 20 is a first piece of table data. The cluster 21 is a second piece of table data. The extraction unit 132 extracts the cluster 20 and the cluster 21 as the first table data. Note that, the cluster 20 has no cells to which data is input in the fifth row as compared with the cluster 21, but empty characters are added in the fifth row to make the table sizes uniform.

Returning to the explanation of FIG. 1, when the first table data is input from the extraction unit 132, the editing unit 133 executes an editing process on the input first table data. First, the editing unit 133 temporarily determines the uppermost row or the leftmost column, among the cells constituting the table excluding the title cell, in the first table data, as the item row or the item column. Note that, the title cell may be determined as the uppermost row or leftmost column, in which the data input number used in the extraction unit 132 is "1", in the first table data. In a case where a specific cell subjected to a cell interconnection process is included in a temporarily determined item row or item column, the editing unit 133 divides the specific cell into unit cells. In addition, the editing unit 133 inputs, to each of the divided unit cells, the same data as the data input to the specific cell. The editing unit 133 outputs the table data for which the editing process has been completed, as second table data, to the counting unit 134 and the generation unit 135. Further, in a case where a specific cell subjected to the cell interconnection process is not included in a temporarily determined item row or item column, the editing unit 133 outputs the input first table data as it is as the second table data, to the counting unit 134 and the generation unit 135.

Here, the editing process is described with reference to FIGS. 6 to 9. FIG. 6 is a diagram illustrating an exemplary editing process. In the example of FIG. 6, the first row of first table data 22 includes cells subjected to a cell interconnection process. For example, the cells with values "a" and "b" are specific cells subjected to the cell interconnection process. The editing unit 133 divides the specific cells into unit cells and inputs the values "a" and "b" to the divided unit cells, respectively. The editing unit 133 outputs second table data 23 for which the editing process has been completed, to the counting unit 134 and the generation unit 135.

Figure 7:
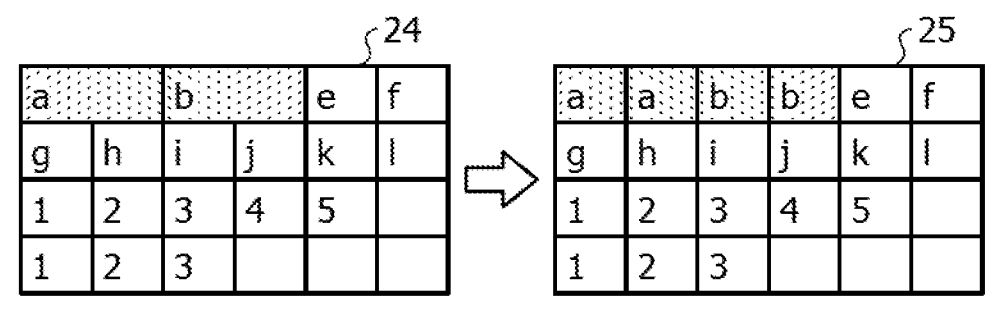

FIG. 7 is a diagram illustrating another exemplary editing process. In the example of FIG. 7, as in the example of FIG. 6, the values "a" and "b" of the specific cells subjected to the cell interconnection process of first table data 24 are input to the divided unit cells respectively to form second table data 25.

FIG. 8 is a diagram illustrating another exemplary editing process. In the example of FIG. 8, the first column of first table data 26 includes cells subjected to a cell interconnection process. For example, the cells with values "g" and "h" are specific cells subjected to the cell interconnection process. The editing unit 133 divides the specific cells into unit cells and inputs the values "g" and "h" to the divided unit cells, respectively. The editing unit 133 outputs second table data 27 for which the editing process has been completed, to the counting unit 134 and the generation unit 135. For example, the editing unit 133 divides specific cells subjected to the cell interconnection process in the row direction and specific cells subjected to the cell interconnection process in the column direction into unit cells, and inputs the values of the specific cells in the divided unit cells, respectively.

FIG. 9 is a diagram illustrating an exemplary cancellation of interconnection of cells in a row which is not an item row. In the example of FIG. 9, the last row of first table data 28, for example, the fourth row includes cells subjected to the cell interconnection process. For example, the cell with the value "100" is a specific cell subjected to the cell interconnection process. Since the last row of the first table data 28 is not an item row, the editing unit 133 divides a specific cell into unit cells and inputs the value "100" to one of the divided unit cells. The editing unit 133 outputs second table data 29 for which the editing process has been completed, to the counting unit 134 and the generation unit 135. Note that in the example of FIG. 9, the explanation of cancellation of the cell interconnection process in the first row is omitted. The cancellation of interconnection of cells in a row other than the item row may be performed after the item row or the item column is specified by the specifying unit 137.

Returning to the explanation of FIG. 1, when second table data is input from the editing unit 133, the counting unit 134 counts, for each row or each column, the number of cells to which data is input among the second table data. For example, the counting unit 134 counts, for each row or each column, the number of cells to which data is input, among blocks of row or column. The counting unit 134 outputs the number of counted cells for each row or column to the detection unit 136 as a count value.

To the generation unit 135, first table data is input from the extraction unit 132 and second table data is input from the editing unit 133. First, the generation unit 135 temporarily determines the uppermost row or the leftmost column, among the cells constituting the table excluding the title cell, among the input first table data, as an item row or an item column. Note that the title cell may be determined in the same manner as in the editing unit 133. In a case where a specific cell subjected to a cell interconnection process is included in a temporarily determined item row or item column, the generation unit 135 temporarily determines a range including the specific cell as a plurality of consecutive item rows or a plurality of consecutive item columns. For example, the generation unit 135 temporarily determines a row or a column including each unit cell obtained by dividing a specific cell and an adjacent row on the lower side of the row or an adjacent column on the right side of the column, as a plurality of consecutive item rows or a plurality of consecutive item columns.

When a plurality of consecutive item rows or a plurality of consecutive item columns are temporarily determined, the generation unit 135 generates an item name for the second table data input from the editing unit 133. For example, for the temporarily determined plurality of consecutive item rows or plurality of consecutive item columns, the generation unit 135 generates, as an item name, a value obtained by combining values of the same column or interconnected cells including cells of the same column, or values of the same row or interconnected cells including cells of the same row. Note that the interconnected cell is a specific cell subjected to the cell interconnection process. The generation unit 135 outputs the second table data to which the generated item name is applied, as third table data to the detection unit 136. In the case where a specific cell subjected to the cell interconnection process is not included in the temporarily determined item row or item column, the generation unit 135 outputs the input second table data as it is as third table data to the detection unit 136.

Here, the generation of an item name is described with reference to FIGS. 10 and 11. FIG. 10 is a diagram illustrating an exemplary generation of an item name. In the example of FIG. 10, the generation unit 135 temporarily determines the first row and the second row and the first column and the second column as item rows and item columns, respectively, for first table data 30. Next, in the first row and the second row, the generation unit 135 generates a value obtained by combining values of the same column or interconnected cells including cells of the same column, as an item name of each item row. Note that the combined value is generated based on the second table data (not illustrated) for which the cell interconnection process is canceled for the specific cell subjected to the cell interconnection process. For example, the generation unit 135 generates "b/f" obtained by combining "b" in the first row and the third column and "f" in the second row and the third column of the first table data 30 as the item name of the first row and the second column of third table data 31.

Further, in the first column and the second column, the generation unit 135 generates a value obtained by combining values of the same row or interconnected cells including cells of the same row, as an item name of each item column. For example, the generation unit 135 generates "j/m" obtained by combining "j" in the third row and the first column and "m" in the third row and the second column of the first table data 30 as the item name of the second row and the first column of the third table data 31. Note that in the first table data 30, since the four cells of the first row and the first column, the first row and the second column, the second row and the first column, and the second row and the second column are interconnected to each other and the value is "a", in the third table data 31, the item name of the first row and the first column is "a".

Figure 11:
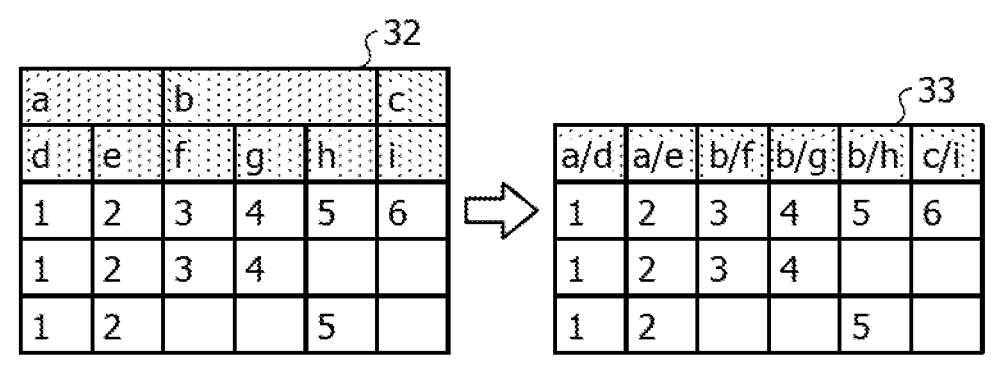

FIG. 11 is a diagram illustrating another exemplary generation of an item name. In the example of FIG. 11, the generation unit 135 temporarily determines the first row and the second row as item rows, for first table data 32. Next, in the first row and the second row, the generation unit 135 generates a value obtained by combining values of the same column or interconnected cells including cells of the same column, as an item name of each item row. Note that the combined value is generated based on the second table data (not illustrated) for which the cell interconnection process is canceled for the specific cell subjected to the cell interconnection process. For example, the generation unit 135 generates "a/d" obtained by combining "a" in the first row and the first column and "d" in the second row and the first column of the first table data 32 as the item name of the first row and the first column of third table data 33. In addition, for example, the generation unit 135 generates "a/e" obtained by combining "a" in the first row and the second column and "e" in the second row and the second column of the first table data 32 as the item name of the first row and the second column of the third table data 33.

Returning to the explanation of FIG. 1, to the detection unit 136, a count value is input from the counting unit 134 and third table data is input from the generation unit 135. The detection unit 136 detects the uppermost row or the leftmost column among the rows or columns having the maximum input count value, for the input third table data. The detection unit 136 outputs the detected uppermost row or leftmost column as a detection result to the specifying unit 137 together with the count value and the third table data.

The detection result from the detection unit 136, the count value, and the third table data are input to the specifying unit 137. Based on the count value and the third table data, the specifying unit 137 specifies the uppermost row or the leftmost column among the rows or columns with the maximum count value, as a row or a column indicating an item of the table. For example, the specifying unit 137 specifies an item row or an item column. The specifying unit 137 sets the third table data for which specification has been completed as fourth table data. The specifying unit 137 outputs the specified item row or item column and the fourth table data to the storage control unit 138.

In addition, the specifying unit 137 may specify an item row or item column based on the detection result, the count value, and the third table data. In a case where the count value corresponding to the lower row adjacent to the detected uppermost row is not the maximum, the specifying unit 137 specifies the uppermost row as the row indicating the item of the table. Alternatively, in a case where the count value corresponding to the right column adjacent to the detected leftmost column is not the maximum, the specifying unit 137 specifies the leftmost column as the column indicating the item of the table. For example, the specifying unit 137 specifies an item row or an item column. The specifying unit 137 sets the third table data for which specification has been completed as the fourth table data. The specifying unit 137 outputs the specified item row or item column and the fourth table data to the storage control unit 138.

Further, in a case where the plurality of rows has the same count value, the specifying unit 137 may specify an item row or an item column, based on the proportion of the cells to which the non-numerical data is input. The specifying unit 137 specifies a row indicating an item, based on the proportion of the cells to which non-numerical data is input among the cells in the rows, for a plurality of rows, in a case where a plurality of consecutive rows including the detected uppermost row have the same count value. Alternatively, the specifying unit 137 specifies a column indicating an item, based on the proportion of the cells to which non-numerical data is input among the cells in the columns, for a plurality of columns, in a case where a plurality of consecutive columns including the detected leftmost column have the same count value. For example, the specifying unit 137 specifies an item row or an item column. The specifying unit 137 sets the third table data for which specification has been completed as the fourth table data. The specifying unit 137 outputs the specified item row or item column and the fourth table data to the storage control unit 138.

In addition, the specifying unit 137 may specify an item row or an item column, by adopting the item row or the item column temporarily determined by the editing unit 133. Further, the specifying unit 137 may specify an item row or item column by adopting a plurality of consecutive item rows or a plurality of consecutive item columns temporarily determined by the generation unit 135. The specifying unit 137 sets the third table data for which specification has been completed as the fourth table data. The specifying unit 137 outputs the specified item row or item column and the fourth table data to the storage control unit 138.

Further, in a case where the third table data is a table in which there is no item row or item column, the specifying unit 137 may specify an item row or an item column by regarding the uppermost row or the leftmost column as the item row or the item column. The specifying unit 137 specifies the uppermost row or the leftmost column as an item row or an item column, even in a case where the uppermost row or the leftmost column among rows or columns having the maximum count value includes a cell of which input data is not an item name. The specifying unit 137 sets the third table data for which specification has been completed as the fourth table data. The specifying unit 137 outputs the specified item row or item column and the fourth table data to the storage control unit 138.

Further, the specifying unit 137 may add a new item row or item column, in a case where the input data includes overlapping cells. The specifying unit 137 adds a new row further above the uppermost row or a new column further left the leftmost column, in a case where the uppermost row or the leftmost column among rows or columns having the maximum count value includes a cell having overlapping input data. The specifying unit 137 specifies the added row or column as an item row or an item column. The specifying unit 137 sets the third table data to which a new row or column is added and for which specification has been completed, as the fourth table data. The specifying unit 137 outputs the specified item row or item column and the fourth table data to the storage control unit 138.

Further, the specifying unit 137 may add a new item row or item column in a case where the uppermost row or the leftmost column includes a blank cell. Note that a blank cell is represented by an empty character (NULL). The specifying unit 137 adds a new row further above the uppermost row or a new column further left the leftmost column, in a case where the uppermost row or the leftmost column among rows or columns having the maximum count value includes a blank cell. The specifying unit 137 specifies the added row or column as an item row or an item column. The specifying unit 137 sets the third table data to which a new row or column is added and for which specification has been completed, as the fourth table data. The specifying unit 137 outputs the specified item row or item column and the fourth table data to the storage control unit 138.

Figure 12:
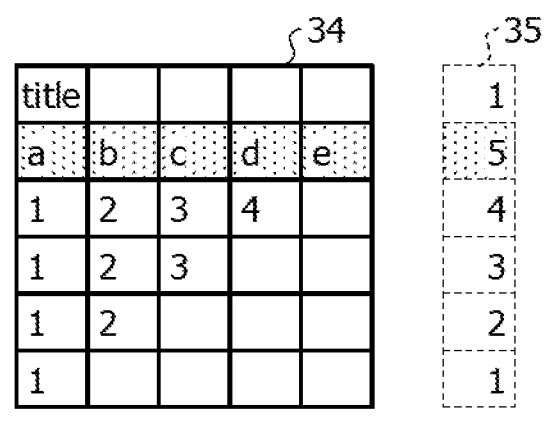

Here, item row specification is described with reference to FIGS. 12 to 20. FIG. 12 is a diagram illustrating an exemplary item row specification. In the example of FIG. 12, an item row is specified, in a case where there is one row having the maximum count value. In third table data 34, when looking at a count value 35, the second row is "5" which is the maximum. Since the count value of the third row which is the lower row adjacent to the second row is "4" and is not the maximum, the specifying unit 137 specifies the second row as the item row.

Figure 13:
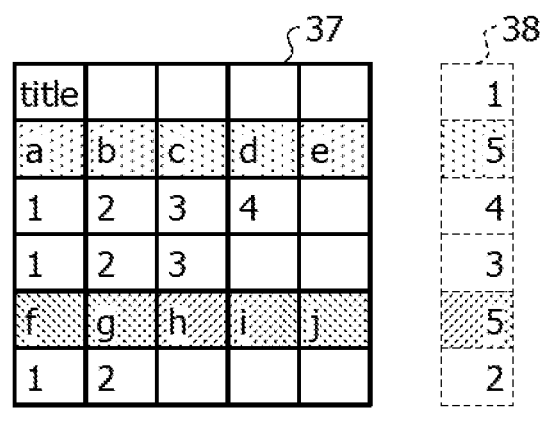

FIG. 13 is a diagram illustrating another exemplary item row specification. In the example of FIG. 13, an item row is specified, in a case where there is a plurality of rows having the maximum count value. In third table data 37, when looking at a count value 38, the second and fifth rows are "5" which is the maximum. The specifying unit 137 specifies the second row, which is the uppermost row, among the rows with the maximum count value, as the item row.

FIG. 14 is a diagram illustrating another exemplary item row specification. In the example of FIG. 14, the item row is specified based on the proportion of cells to which non-numerical data is input. Looking at a count value 42 of third table data 41, the second and third rows are "5" which is the maximum. Here, count values 42 of other rows are omitted. Further, in the third table data 41, a proportion 43 of cells to which non-numerical data is input is 100% in the second row and 40% in the third row. The specifying unit 137 determines whether or not the proportion of the third row adjacent to the second row is, for example, 50% or more. Since the proportion of the third row is 40%, the specifying unit 137 determines that the third row is not an item row and specifies the second row as the item row.

Figure 15:
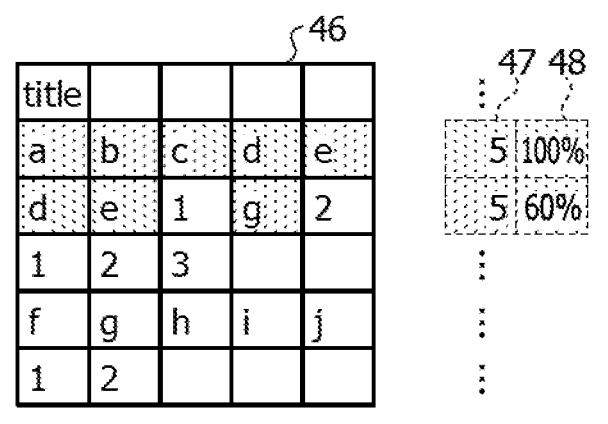

FIG. 15 is a diagram illustrating another exemplary item row specification. In the example of FIG. 15, the item row is specified based on the proportion of cells to which non-numerical data is input. Looking at a count value 47 of third table data 46, the second and third rows are "5" which is the maximum. Here, count values 47 of other rows are omitted. Further, in the third table data 46, a proportion 48 of cells to which non-numerical data is input is 100% in the second row and 60% in the third row. The specifying unit 137 determines whether or not the proportion of the third row adjacent to the second row is, for example, 50% or more. Since the proportion of the third row is 60%, the specifying unit 137 determines that the third row is an item row and specifies the second row and the third row as item rows. Incidentally, the numerical data input to the item row, is, for example, the number of transportation systems or the like.

Figure 16:
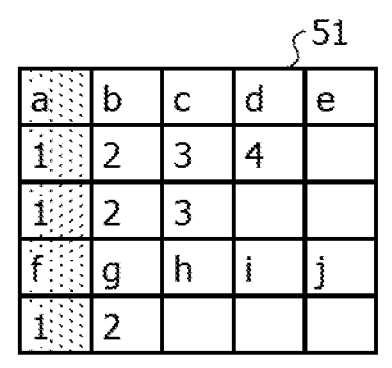

FIG. 16 is a diagram illustrating an exemplary item column specification. In the example of FIG. 16, the item column is specified by regarding the leftmost column as the item column, in the case of a table without an item column. In third table data 51, the first row is an item row, but data is input to the cells of the first column after the second row. In this case, the specifying unit 137 regards the first column which is the leftmost column as the item column and specifies the first column as the item column.

Figure 17:
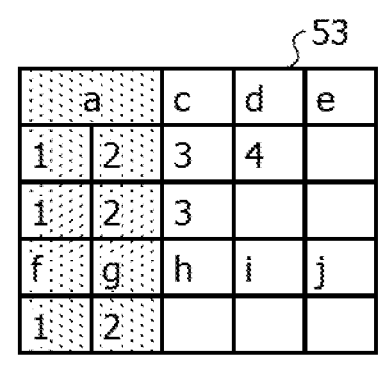

FIG. 17 is a diagram illustrating another exemplary item column specification. In the example of FIG. 17, the item column is specified by regarding the leftmost column as the item column, in the case of a table without an item column. In first table data 53, the first row is an item row, but data is input to the cells of the first column after the second row. In addition, the first table data 53 is a specific cell in which the cell in the first row and the first column and the cell in the first row and the second column are interconnected. In this case, since the specific cell is included in the first column, the specifying unit 137 regards a column including the specific cell, for example, the first column and the second column, as item columns and specifies the first column and the second column as item columns. In addition to the detection result, the count value, and the third table data, the specifying unit 137 refers to the first table data stored in the storage unit 120 and specifies the item column.

FIG. 18 is a diagram illustrating an exemplary item row addition. In the example of FIG. 18, a new item row or a new item column is added, in a case where the input data includes overlapping cells. In third table data 56, both the data of the first row and the first column and the data of the first row and the second column are "a", and the first row includes the cells in which the input data overlap. In this case, the specifying unit 137 adds a new row further above the uppermost row to form fourth table data 58. The specifying unit 137 specifies a row 59 added to the fourth table data 58 as an item row.

Figure 19:
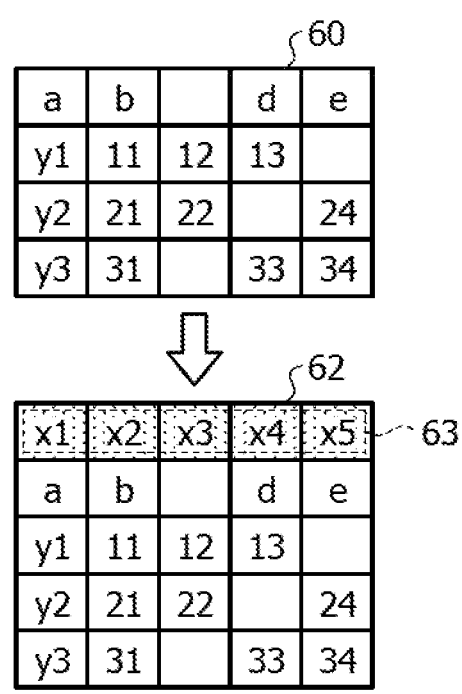
FIG. 19 is a diagram illustrating another exemplary item row addition.

FIG. 19 is a diagram illustrating another exemplary item row addition. In the example in FIG. 19, a new item row is added, in a case where the uppermost row includes a blank cell. In third table data 60, the cell of the first row and the third column is blank. In this case, the specifying unit 137 adds a new row further above the uppermost row to form fourth table data 62. The specifying unit 137 specifies a row 63 added to the fourth table data 62 as an item row. In addition, in the third table data 60, there is also a blank cell in another row and the first row is included in the rows having the maximum count value. In such a case, since the second and subsequent rows are not erroneously recognized as item rows, this example may be applied.

Figure 20:
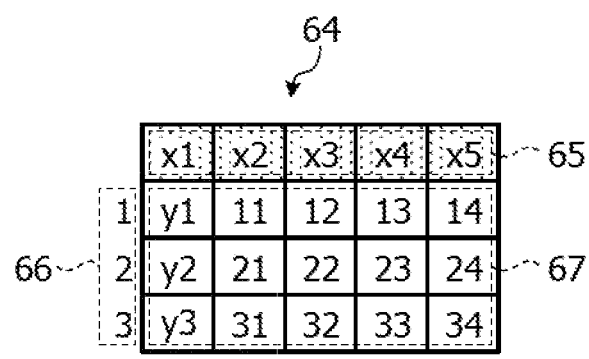
FIG. 20 is a diagram illustrating exemplary table data after shaping.

FIG. 20 is a diagram illustrating exemplary table data after shaping. Fourth table data 64 illustrated in FIG. 20 is table data after an item row or an item column is specified by the specifying unit 137, for example, table data after shaping. The fourth table data 64 has an item row 65, a data row number 66, and a data portion 67. For example, the fourth table data 64 is in a state in which the number of rows and the item name are associated with each data (cell value). The data row number 66 may not be included in the fourth table data 64 and may be added by counting the number of rows when storing data in the information DB 121.

Returning to the explanation of FIG. 1, the item row or item column specified by the specifying unit 137 and the fourth table data are input to the storage control unit 138. The storage control unit 138 sets the input data of each cell of the item row or the item column as the item name and stores the value of each row or each column in association with the corresponding item name and the data row number in the information DB 121, based on the specified item row or item column and the fourth table data.

Figure 21:
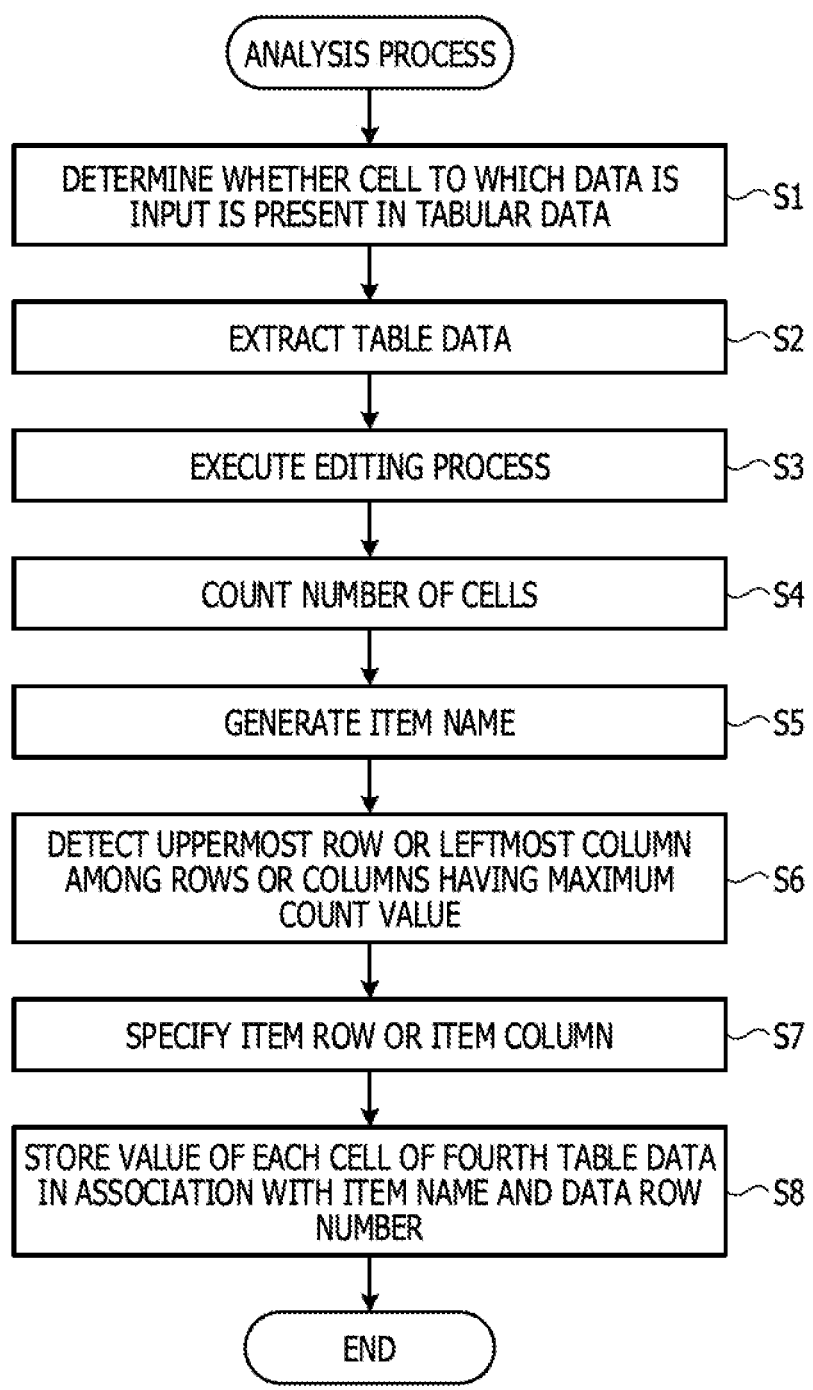
FIG. 21 is a flowchart illustrating an exemplary analysis process of the embodiment.

Next, the operation of the information processing apparatus 100 of the embodiment is described. FIG. 21 is a flowchart illustrating an exemplary analysis process of the embodiment.

The communication unit 110 of the information processing apparatus 100 receives tabular data from a terminal device (not illustrated). The communication unit 110 outputs the received tabular data to the control unit 130. When tabular data is input from the communication unit 110, the determination unit 131 determines whether a cell to which data is input is present in the input tabular data (step S1). The determination unit 131 outputs the tabular data and the determination result to the extraction unit 132.

When the tabular data and the determination result are input from the determination unit 131, the extraction unit 132 extracts, from the tabular data, blocks of a plurality of consecutive rows or columns having cells in which the data is input, as one piece of table data, based on the determination result (step S2). Upon extracting the table data, the extraction unit 132 outputs the extracted table data as first table data to the editing unit 133 and the generation unit 135. In addition, the extraction unit 132 stores the first table data in the storage unit 120.

When the first table data is input from the extraction unit 132, the editing unit 133 executes an editing process on the input first table data (step S3). The editing unit 133 outputs the table data for which the editing process has been completed, as second table data, to the counting unit 134 and the generation unit 135.

When the second table data is input from the editing unit 133, the counting unit 134 counts, for each row or each column, the number of cells to which data is input among the second table data (step S4). The counting unit 134 outputs the number of counted cells for each row or column to the detection unit 136 as a count value.

To the generation unit 135, the first table data is input from the extraction unit 132 and the second table data is input from the editing unit 133. The generation unit 135 temporarily determines an item row or an item column based on the input first table data. In a case where a specific cell subjected to a cell interconnection process is included in a temporarily determined item row or item column, the generation unit 135 temporarily determines a plurality of consecutive item rows or a plurality of consecutive item columns corresponding to a specific cell. When a plurality of consecutive item rows or a plurality of consecutive item columns are temporarily determined, the generation unit 135 generates an item name for the second table data input from the editing unit 133 (step S5). The generation unit 135 outputs the second table data to which the generated item name is applied, as third table data to the detection unit 136. In the case where a specific cell subjected to the cell interconnection process is not included in the temporarily determined item row or item column, the generation unit 135 outputs the input second table data as it is as the third table data to the detection unit 136.

To the detection unit 136, a count value is input from the counting unit 134 and the third table data is input from the generation unit 135. The detection unit 136 detects the uppermost row or the leftmost column among the rows or columns having the maximum input count value, for the input third table data (step S6). The detection unit 136 outputs the detected uppermost row or leftmost column as a detection result to the specifying unit 137 together with the count value and the third table data.

The detection result from the detection unit 136, the count value, and the third table data are input to the specifying unit 137. The specifying unit 137 specifies an item row or item column based on the detection result, the count value, and the third table data (step S7). The specifying unit 137 sets the third table data whose specification has been completed as fourth table data, and outputs the specified item row or item column and the fourth table data to the storage control unit 138.

The item row or item column specified by the specifying unit 137 and the fourth table data are input to the storage control unit 138. The storage control unit 138 stores the value of each cell of the fourth table data in association with the item name and the data row number in the information DB 121, based on the specified item row or item column and the fourth table data (step S8). Thus, the information processing apparatus 100 may easily register tabular data of various formats in the database.

In this way, the information processing apparatus 100 determines whether a cell to which data has been input is present for each row or each column of input tabular data. Further, the information processing apparatus 100 extracts a block of a plurality of consecutive rows or columns having cells to which data is input, as a part related to one piece of table data. As a result, tabular data of various formats may easily be registered.

Further, the information processing apparatus 100 counts the number of cells to which data is input, among blocks of rows or columns, for each row or each column. Further, the information processing apparatus 100 specifies the uppermost row or the leftmost column among the rows or columns with the maximum count value as a row or a column indicating an item of the table. As a result, an item row or an item column of the table may be specified.

Further, the information processing apparatus 100 counts the number of cells to which data is input, among blocks of rows or columns, for each row or each column. Further, the information processing apparatus 100 detects the uppermost row or the leftmost column among the rows or columns with the maximum count value. Further, in a case where the count value corresponding to the lower row adjacent to the detected uppermost row is not the maximum, or in a case where the count value corresponding to the right column adjacent to the detected leftmost column is not the maximum, the information processing apparatus 100 specifies the uppermost row or the leftmost column as a row or a column indicating an item of the table. As a result, an item row or an item column of the table may be specified.

Further, the information processing apparatus 100 counts the number of cells to which data is input, among blocks of rows or columns, for each row or each column. Further, the information processing apparatus 100 detects the uppermost row or the leftmost column among the rows or columns with the maximum count value. Further, in a case where a plurality of consecutive rows including the detected uppermost row has the same count value, the information processing apparatus 100 specifies a row indicating an item, based on the proportion of the cells receiving non-numerical data among cells in the row, for a plurality of rows. Alternatively, in a case where a plurality of consecutive columns including the detected leftmost column has the same count value, the information processing apparatus 100 specifies a column indicating an item, based on the proportion of cells receiving non-numerical data among the cells in the column, for a plurality of rows. As a result, an item row or an item column of the table over a plurality of rows may be specified.

Further, the information processing apparatus 100 determines whether a cell to which data has been input is present for each row or each column of input tabular data. Further, the information processing apparatus 100 extracts a block of a plurality of consecutive rows or columns having cells to which data is input, as a part related to one piece of table data. In addition, the information processing apparatus 100 specifies an item row or an item column among blocks of rows or columns. Further, in a case where a specific cell subjected to the cell interconnection process is included in the specific row or column, the information processing apparatus 100 executes an editing process of dividing the specific cell into unit cells and inputting the same data as the data input to the specific cell, to each of the divided unit cells. Further, the information processing apparatus 100 sets the input data of each cell of the item row or item column after the editing process as the item name and stores the value of each row or each column in association with the corresponding item name. As a result, even in a case where a specific cell subjected to a cell interconnection process is included, it may be easily registered in the database.

Further, the information processing apparatus 100 determines whether a cell to which data has been input is present for each row or each column of input tabular data. Further, the information processing apparatus 100 extracts a block of a plurality of consecutive rows or columns having cells to which data is input, as a part related to one piece of table data. Further, the information processing apparatus 100 specifies a plurality of consecutive item rows or a plurality of consecutive item columns among blocks of rows or columns. Further, for the specified plurality of consecutive item rows or plurality of consecutive item columns, the information processing apparatus 100 generates, as an item name, a value obtained by combining values of the same column or interconnected cells including cells of the same column, or values of the same row or interconnected cells including cells of the same row. Further, the information processing apparatus 100 stores the value of each row or each column in association with corresponding item name. As a result, a plurality of item rows or item columns may be combined and easily registered in the database.

Further, the information processing apparatus 100 determines whether a cell to which data has been input is present for each row or each column of input tabular data. Further, the information processing apparatus 100 extracts a block of a plurality of consecutive rows or columns having cells to which data is input, as a part related to one piece of table data. Further, the information processing apparatus 100 counts the number of cells to which data is input, among blocks of rows or columns, for each row or each column. Further, even in a case where the uppermost row or the leftmost column among rows or columns having the maximum count value includes a cell of which input data is not an item name, the information processing apparatus 100 specifies the uppermost row or the leftmost column as an item row or an item column. As a result, tabular data of various formats may be easily registered.

Further, the information processing apparatus 100 determines whether a cell to which data has been input is present for each row or each column of input tabular data. Further, the information processing apparatus 100 extracts a block of a plurality of consecutive rows or columns having cells to which data is input, as a part related to one piece of table data. Further, the information processing apparatus 100 counts the number of cells to which data is input, among blocks of rows or columns, for each row or each column. Further, in a case where the uppermost row or the leftmost column among rows or columns having the maximum count value includes a cell having overlapping input data, the information processing apparatus 100 adds a new row further above the uppermost row and a new column further left the leftmost column and specifies the added row or column as an item row or an item column. As a result, tabular data of various formats may be easily registered.

Further, the information processing apparatus 100 determines whether a cell to which data has been input is present for each row or each column of input tabular data. Further, the information processing apparatus 100 extracts a block of a plurality of consecutive rows or columns having cells to which data is input, as a part related to one piece of table data. Further, the information processing apparatus 100 counts the number of cells to which data is input, among blocks of rows or columns, for each row or each column. Further, in a case where the uppermost row or the leftmost column among rows or columns having the maximum count value includes a blank cell, the information processing apparatus 100 adds a new row further above the uppermost row and a new column further left the leftmost column and specifies the added row or column as an item row or an item column. As a result, tabular data of various formats may be easily registered.

Further, the information processing apparatus 100 determines whether a cell to which data has been input is present for each row or each column of input tabular data. Further, when the information processing apparatus 100 detects two blocks each including one or a plurality of consecutive rows or columns where a cell to which data is input is present with one or a plurality of consecutive rows or columns where there is no cell to which data is input interposed between the two blocks, the two blocks are extracted as different table data, respectively. As a result, tabular data of various formats may be easily registered.

In the above embodiment, the case where the title of the table is described on the upper part of the body part of the table has been described as an example, but embodiments are not limited thereto. For example, even in the case where headings and annotations are described over several rows on the upper part of the body part of the table, as in the above embodiment, it is possible to extract the body part of the table.

Further, in the above embodiment, as a form of the information DB 121, one record is set for each of cells constituting the table data, but embodiments are not limited thereto. For example, the information DB 121 may be any type of database as long as the original table data is restored.

In addition, each constituent element of each unit illustrated in the drawing is not physically configured as illustrated in the drawing. In other words, specific forms of distribution and integration of each unit is not limited to the form illustrated in the drawings, and all or a part thereof may be configured by being distributed or integrated functionally or physically in any units depending on various loads, usage situations or the like. For example, the determination unit 131 and the extraction unit 132 may be integrated. Further, illustrated respective processes are not limited to being executed in the order described above and may be executed at the same time or may be executed with the order changed, as long as the processing contents do not conflict with each other.

Furthermore, all or some of various processing functions executed in each device may be executed on a CPU (or microcomputer of an MPU, a micro controller unit (MCU), or the like). In addition, it goes without saying that all or some of various processing functions may be executed on a program analyzed and executed by a CPU (or microcomputer of an MPU, an MCU, or the like) or on hardware by wired logic.

Figure 22:
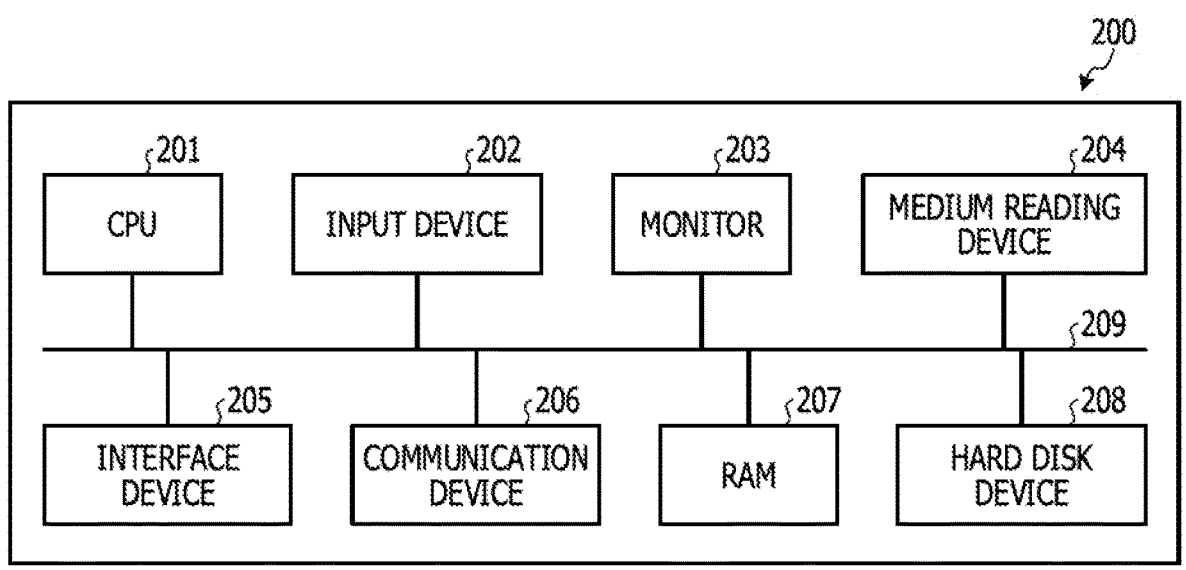
FIG. 22 is a diagram illustrating an exemplary computer that executes a tabular data analysis program.

By the way, various processes described in the above embodiments may be realized by executing a program prepared in advance by a computer. Therefore, in the following, an exemplary computer that executes a program having the same function as in the above embodiment is described. FIG. 22 is a diagram illustrating an exemplary computer that executes a tabular data analysis program.

As illustrated in FIG. 22, the computer 200 includes a CPU 201 that executes various computing processes, an input device 202 that receives data input, and a monitor 203. The computer 200 further includes a medium reading device 204 that reads a program or the like from a storage medium, an interface device 205 for connection to various devices, and a communication device 206 for connection to another information processing apparatus or the like by wired or wireless connection. Further, the computer 200 includes a RAM 207 for temporarily storing various types of information, and a hard disk device 208. In addition, each of the devices 201 to 208 is coupled to the bus 209.

The hard disk device 208 stores a tabular data analysis program having the same functions as the respective processing units of the determination unit 131, the extraction unit 132, the editing unit 133, the counting unit 134, the generation unit 135, the detection unit 136, the specifying unit 137, and the storage control unit 138, illustrated in FIG. 1. Further, the hard disk device 208 stores the information DB 121 and various types of data for realizing the tabular data analysis program. The input device 202 receives input of various types of information such as operation information, management information, or the like, from the administrator of the computer 200, for example. The monitor 203 displays, for example, various screens of a management screen, or the like, to the administrator of the computer 200. For example, a printing apparatus or the like is coupled to the interface device 205. For example, the communication device 206 has the same function as the communication unit 110 illustrated in FIG. 1, is coupled to a network (not illustrated), and exchanges various types of information with a terminal device (not illustrated).

The CPU 201 reads each program stored in the hard disk device 208, develops the program into the RAM 207, and executes the program, thereby executing various processes. Further, these programs are able to cause the computer 200 to function as the determination unit 131, the extraction unit 132, the editing unit 133, the counting unit 134, the generation unit 135, the detection unit 136, the specifying unit 137, and the storage control unit 138, illustrated in FIG. 1.

In addition, the tabular data analysis program may not be stored in the hard disk device 208. For example, the computer 200 may read and execute a program stored in a storage medium readable by the computer 200. Examples of the storage medium readable by the computer 200 include, for example, a portable recording medium of a CD-ROM, a DVD disk, a universal serial bus (USB) memory, or the like, a semiconductor memory of a flash memory or the like, a hard disk drive, or the like. Further, the tabular data analysis program may be stored in a device coupled to a public line, the Internet, a LAN or the like, and the computer 200 may read and execute the tabular data analysis program from these devices.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A tabular data analysis method comprising:
determining, by a computer, whether a cell having data is present for each row or each column of input tabular data in which an item and data are associated with each other;
extracting, in a case where there is one or more cells having data, a block of rows or columns in which the one or more cells are consecutively included, as a part related to one piece of table data;
counting a number of cells to which data is input, in the block of rows or columns, for each row or each column;
adding a new row further above an uppermost row and a new column further left of a leftmost column and specifying the added row or the added column as an item row or an item column indicating the item, in a case where the uppermost row or the leftmost column among rows or columns having a maximum count value includes a cell having the same input data or in a case where the uppermost row or the leftmost column among rows or columns having a maximum count value includes a blank cell in which no data is input; and specifying the uppermost row or the leftmost column as the item row or the item column in a case both where the uppermost row or the leftmost column among rows or columns having the maximum count value of the number of the cells to which the data is input includes no cell having the same input data and where the uppermost row or the leftmost column among rows or columns having the maximum count value of the number of the cells to which the data is input includes no blank cell in which no data is input.

2. The tabular data analysis method according to claim 1, further comprising:
counting a number of the one or more cells in the block of rows or columns, for each row or each column; and
specifying an uppermost row or a leftmost column among rows or columns with a maximum count value, as a row or a column indicating an item of a table.

3. The tabular data analysis method according to claim 1, further comprising:
counting a number of the one or more cells in the block of rows or columns, for each row or each column;
detecting an uppermost row or a leftmost column among rows or columns with a maximum count value; and
specifying the uppermost row or the leftmost column as a row or a column indicating an item of a table, in a case where a count value corresponding to a lower row adjacent to the detected uppermost row is not the maximum count value, or in a case where a count value corresponding to a right column adjacent to the detected leftmost column is not the maximum count value.

4. The tabular data analysis method according to claim 1, further comprising:
counting a number of the one or more cells in the block of rows or columns, for each row or each column;
detecting an uppermost row or a leftmost column among rows or columns with a maximum count value; and
specifying, in a case where a plurality of consecutive rows including the detected uppermost row has a same count value, a row indicating an item, based on a proportion of cells to which non-numerical data is input with respect to cells in each of the plurality of consecutive rows, or specifying, in a case where a plurality of consecutive columns including the detected leftmost column has a same count value, a column indicating an item, based on a proportion of cells to which non-numerical data is input with respect to cells in each of the plurality of consecutive columns.

5. The tabular data analysis method according to claim 1, further comprising:
specifying an item row or an item column in the block of rows or columns; executing, in a case where a specific cell subjected to a cell interconnection process is included in the specified item row or item column, an editing process of dividing the specific cell into unit cells and inputting, to each of the divided unit cells, same data as data input to the specific cell; and
setting the data input to each cell of the item row or item column after the editing process, as an item name, and storing the value of each row or each column in association with a corresponding item name.

6. The tabular data analysis method according to claim 1, further comprising:
specifying a plurality of consecutive item rows or a plurality of consecutive item columns in the block of rows or columns; generating, as an item name, a value obtained by combining values of a same column or interconnected cells including cells of the same column, or values of a same row or interconnected cells including cells of the same row, for the specified plurality of item rows or plurality of item columns; and
storing the value of each row or each column in association with a corresponding item name.

7. The tabular data analysis method according to claim 1, further comprising:
specifying an uppermost row or a leftmost column as an item row or an item column, in a case where the uppermost row or the leftmost column among rows or columns having a maximum count value includes a cell of which input data is not an item name.

8. A non-transitory computer-readable recording medium recording a tabular data analysis program which causes a computer to execute a process, the process comprising:
determining whether a cell having data is present for each row or each column of input tabular data in which an item and data are associated with each other;
extracting, in a case where there is one or more cells having data, a block of rows or columns in which the one or more cells are consecutively included, as a part related to one piece of table data;
counting a number of cells to which data is input, in the block of rows or columns, for each row or each column;
adding a new row further above an uppermost row and a new column further left of a leftmost column and specifying the added row or the added column as an item row or an item column indicating the item, in a case where the uppermost row or the leftmost column among rows or columns having a maximum count value includes a cell having the same input data or in a case where the uppermost row or the leftmost column among rows or columns having a maximum count value includes a blank cell in which no data is input; and
specifying the uppermost row or the leftmost column as the item row or the item column in a case both where the uppermost row or the leftmost column among rows or columns having the maximum count value of the number of the cells to which the data is input includes no cell having the same input data and where the uppermost row or the leftmost column among rows or columns having the maximum count value of the number of the cells to which the data is input includes no blank cell in which no data is input.

9. The non-transitory computer-readable recording medium according to claim 8, further comprising:
counting a number of the one or more cells in the block of rows or columns, for each row or each column; and
specifying an uppermost row or a leftmost column among rows or columns with a maximum count value, as a row or a column indicating an item of a table.

10. The non-transitory computer-readable recording medium according to claim 8, further comprising:
counting a number of the one or more cells in the block of rows or columns, for each row or each column;
detecting an uppermost row or a leftmost column among rows or columns with a maximum count value; and
specifying the uppermost row or the leftmost column as a row or a column indicating an item of a table, in a case where a count value corresponding to a lower row adjacent to the detected uppermost row is not the maximum count value, or in a case where a count value corresponding to a right column adjacent to the detected leftmost column is not the maximum count value.

11. The non-transitory computer-readable recording medium according to claim 8, further comprising:
counting a number of the one or more cells in the block of rows or columns, for each row or each column;
detecting an uppermost row or a leftmost column among rows or columns with a maximum count value; and
specifying, in a case where a plurality of consecutive rows including the detected uppermost row has a same count value, a row indicating an item, based on a proportion of cells to which non-numerical data is input with respect to cells in each of the plurality of consecutive rows, or specifying, in a case where a plurality of consecutive columns including the detected leftmost column has a same count value, a column indicating an item, based on a proportion of cells to which non-numerical data is input with respect to cells in each of the plurality of consecutive columns.

12. The non-transitory computer-readable recording medium according to claim 8, further comprising:
specifying an item row or an item column in the block of rows or columns;
executing, in a case where a specific cell subjected to a cell interconnection process is included in the specified item row or item column, an editing process of dividing the specific cell into unit cells and inputting, to each of the divided unit cells, same data as data input to the specific cell; and
setting the data input to each cell of the item row or item column after the editing process, as an item name, and storing the value of each row or each column in association with a corresponding item name.

13. The non-transitory computer-readable recording medium according to claim 8, further comprising:
specifying a plurality of consecutive item rows or a plurality of consecutive item columns in the block of rows or columns;
generating, as an item name, a value obtained by combining values of a same column or interconnected cells including cells of the same column, or values of a same row or interconnected cells including cells of the same row, for the specified plurality of item rows or plurality of item columns; and
storing the value of each row or each column in association with a corresponding item name.

14. The non-transitory computer-readable recording medium according to claim 8, further comprising:
specifying an uppermost row or a leftmost column as an item row or an item column, in a case where the uppermost row or the leftmost column among rows or columns having a maximum count value includes a cell of which input data is not an item name.

15. An information processing apparatus comprising:
a memory;
a processor coupled to the memory and configured to execute a process, the process comprising:
determining whether a cell having data is present for each row or each column of input tabular data in which an item and data are associated with each other;
extracting, in a case where there is one or more cells having data, a block of rows or columns in which the one or more cells are consecutively included, as a part related to one piece of table data;
counting a number of cells to which data is input, in the block of rows or columns, for each row or each column;
adding a new row further above an uppermost row and a new column further left of a leftmost column and specifying the added row or the added column as an item row or an item column indicating the item, in a case where the uppermost row or the leftmost column among rows or columns having a maximum count value includes a cell having the same input data or in a case where the uppermost row or the leftmost column among rows or columns having a maximum count value includes a blank cell in which no data is input; and
specifying the uppermost row or the leftmost column as the item row or the item column in a case both where the uppermost row or the leftmost column among rows or columns having the maximum count value of the number of the cells to which the data is input includes no cell having the same input data and where the uppermost row or the leftmost column among rows or columns having the maximum count value of the number of the cells to which the data is input includes no blank cell in which no data is input.

16. The information processing apparatus according to claim 15, wherein the process further includes:
counting a number of the one or more cells in the block of rows or columns, for each row or each column; and
specifying an uppermost row or a leftmost column among rows or columns with a maximum count value, as a row or a column indicating an item of a table.

* * * * *